United States Patent
Sugano

(10) Patent No.: US 11,714,421 B2
(45) Date of Patent: Aug. 1, 2023

(54) DRIVING SUPPORT APPARATUS

(71) Applicant: TOYOTA JIDOSHA KABUSHIKI KAISHA, Aichi-ken (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 17/562,447

(22) Filed: Dec. 27, 2021

(65) Prior Publication Data

US 2022/0121214 A1    Apr. 21, 2022

Related U.S. Application Data

(63) Continuation of application No. 17/039,304, filed on Sep. 30, 2020, now Pat. No. 11,449,066, which is a
(Continued)

(30) Foreign Application Priority Data

Sep. 28, 2017    (JP) .................................. 2017-188766

(51) Int. Cl.
    *G05D 1/02*    (2020.01)
    *G08G 1/04*    (2006.01)
    (Continued)

(52) U.S. Cl.
    CPC ....... *G05D 1/0225* (2013.01); *B62D 15/0285* (2013.01); *G05D 1/0214* (2013.01);
    (Continued)

(58) Field of Classification Search
    None
    See application file for complete search history.

(56) References Cited

U.S. PATENT DOCUMENTS

| 9,696,720 B2 | 7/2017 | Seo et al. |
| 9,783,194 B2 | 10/2017 | Seo et al. |

(Continued)

FOREIGN PATENT DOCUMENTS

| JP | 2015-096411 A | 5/2015 |
| JP | 2016-099953 A | 5/2016 |
| JP | 2008279949 A | 11/2018 |

OTHER PUBLICATIONS

Notice of Allowance dated Jun. 29, 2022, issued in U.S. Appl. No. 17/039,304.
U.S. Appl. No. 17/039,304, filed Sep. 30, 2020 (Sugano).

*Primary Examiner* — Todd Melton
(74) *Attorney, Agent, or Firm* — Sughrue Mion, PLLC

(57) ABSTRACT

A driving support apparatus (12) is configured to support a vehicle (1) to travel at a parking lot, a parking spot (PS) at which the vehicle should be parked is defined by a parking section line (PL) at the parking lot, the driving support apparatus is configured to: detect a specific edge part (PLE) of the parking section line that is an edge part nearest to a traveling space at which the vehicle travels at the parking lot; set a virtual road section line (VDL) if a plurality of specific edge parts are detected at a specific area (LSA, RSA) located on a predetermined side viewed from the vehicle, the virtual road section line is an approximate line connecting the plurality of detected specific edge parts at the specific area; and support the vehicle to travel on the basis of the set road section line.

4 Claims, 10 Drawing Sheets

Related U.S. Application Data continuation of application No. 16/127,847, filed on Sep. 11, 2018, now Pat. No. 10,860,031.

(51) Int. Cl.
*G08G 1/14* (2006.01)
*B62D 15/02* (2006.01)
*G06V 20/56* (2022.01)
*G06V 20/58* (2022.01)

(52) U.S. Cl.
CPC ............ *G05D 1/0238* (2013.01); *G06V 20/56* (2022.01); *G06V 20/586* (2022.01); *G06V 20/588* (2022.01); *G08G 1/04* (2013.01); *G08G 1/143* (2013.01); *G05D 2201/0213* (2013.01)

(56) References Cited

U.S. PATENT DOCUMENTS

| | | |
|---|---|---|
| 10,481,609 B2 | 11/2019 | Moosaei et al. |
| 2018/0170367 A1 | 6/2018 | Ohshima |
| 2021/0048828 A1 | 2/2021 | Sugano |

DRIVING SUPPORT APPARATUS

CROSS-REFERENCE TO RELATED APPLICATIONS

This application is a Continuation of U.S. application Ser. No. 17/039,304, filed Sep. 30, 2020, which is a Continuation of U.S. application Ser. No. 16/127,847 filed Sep. 11, 2018, which claims priority based on Japanese Patent Application No. 2017-188766 filed Sep. 28, 2017, the contents of all of which are incorporated herein by reference in their entirety.

TECHNICAL FIELD

The present invention relates to a technical field of a driving support apparatus that is configured to support the vehicle to travel at a parking lot, for example.

BACKGROUND ART

A Patent Literature 1 discloses one example of a driving support apparatus. Specifically, the Patent Literature 1 discloses an automatic driving system that is configured to obtain a current position of a vehicle by receiving radio waves from satellites of a GNSS (Global Navigation Satellite System) and to support the vehicle so that the vehicle automatically travels (in other words, moves) at a parking lot on the basis of the obtained current position of the vehicle.

CITATION LIST

Patent Literature

[Patent Literature 1] Japanese Unexamined Patent Application Publication No. 2016-099953

SUMMARY OF INVENTION

Technical Problem

There is a possibility that there is a difference (in other words, an error) of several meters between the current position of the vehicle obtained by the GNSS (in other words, a GPS (Global Positioning System)) and an actual position of the vehicle. Thus, there is a possibility that the vehicle travels at a position that is away from a driving route along which the vehicle should travel at the parking lot. Thus, there is a technical problem that the driving support apparatus disclosed in the Patent Literature 1 has a room for improvement of allowing the vehicle to travel more safely at the parking lot.

On the other hand, there is a technology, as a technology for making the vehicle travel automatically, for detecting a road section line (for example, a white line) that extends along a traveling direction of the vehicle to define a driving lane on which the vehicle should travel and then making the vehicle travel so that the vehicle is away from the detected road section line by a predetermined distance. However, the road section line is not drawn on the ground at the parking lot, and thus, it is difficult to make the vehicle travel more safely at the parking lot even if this technology is merely used.

Note that same technical problem occurs not only in the case where the vehicle is supported to travel so that the vehicle automatically travels at the parking lot more safely but also in the case where the vehicle is supported to travel by any method (for example, the vehicle is supported to travel on the basis of an operation of a driver).

The above described technical problem is one example of the technical problem to be solved by the present invention. It is therefore an object of the present invention to provide, for example, a driving support apparatus that is configured to support the vehicle to travel at the parking lot more safely.

Solution to Problem

One aspect of a driving support apparatus of the present invention is a driving support apparatus that is configured to support a vehicle to travel at a parking lot, a parking spot at which the vehicle should be parked is defined by a parking section line at the parking lot, the driving support apparatus has a controller, the controller is programmed to: detect a specific edge part of the parking section line on the basis of a surrounding image of the vehicle, the specific edge part is an edge part that is nearest to a traveling space among the edge parts of the parking section line, the traveling space is a space at which the vehicle travels at the parking lot; set a virtual road section line if a plurality of specific edge parts are detected at a specific area that is located on a predetermined side viewed from the vehicle, the virtual road section line being an approximate line that connects the plurality of detected specific edge parts at the specific area; and support the vehicle to travel on the basis of the set road section line.

Figure 3A:
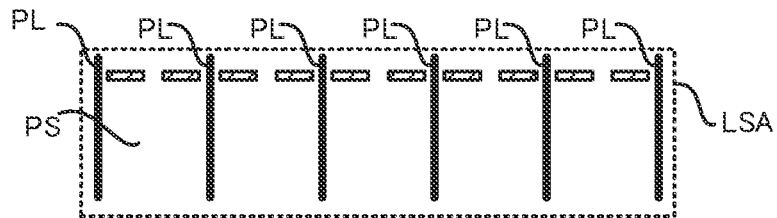
Figure 3B:
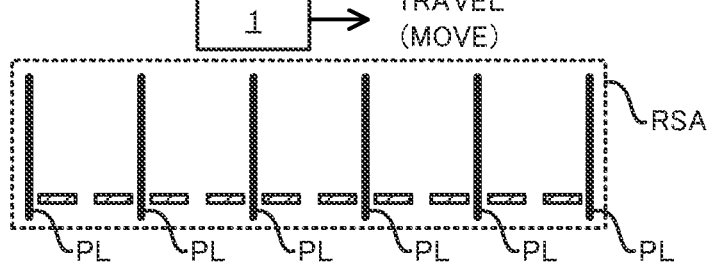
Figure 3C:
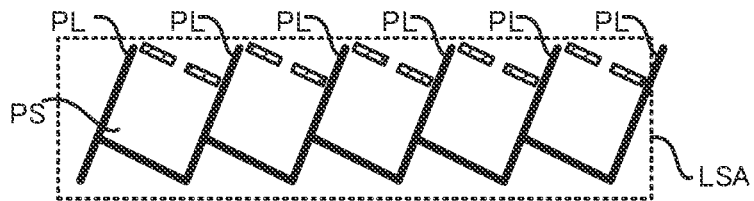

Each of FIG. 3A to FIG. 3C is a planar view that illustrates one example of a parking section line.

Figure 4:
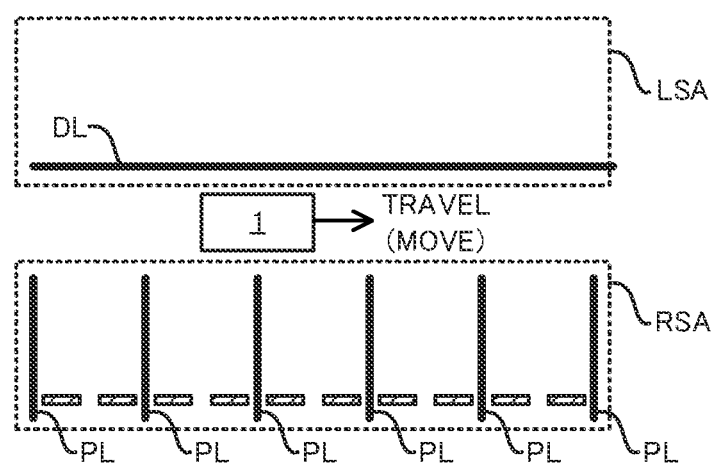

FIG. 4 is a planar view that illustrates another example of a parking section line.

Figure 2:
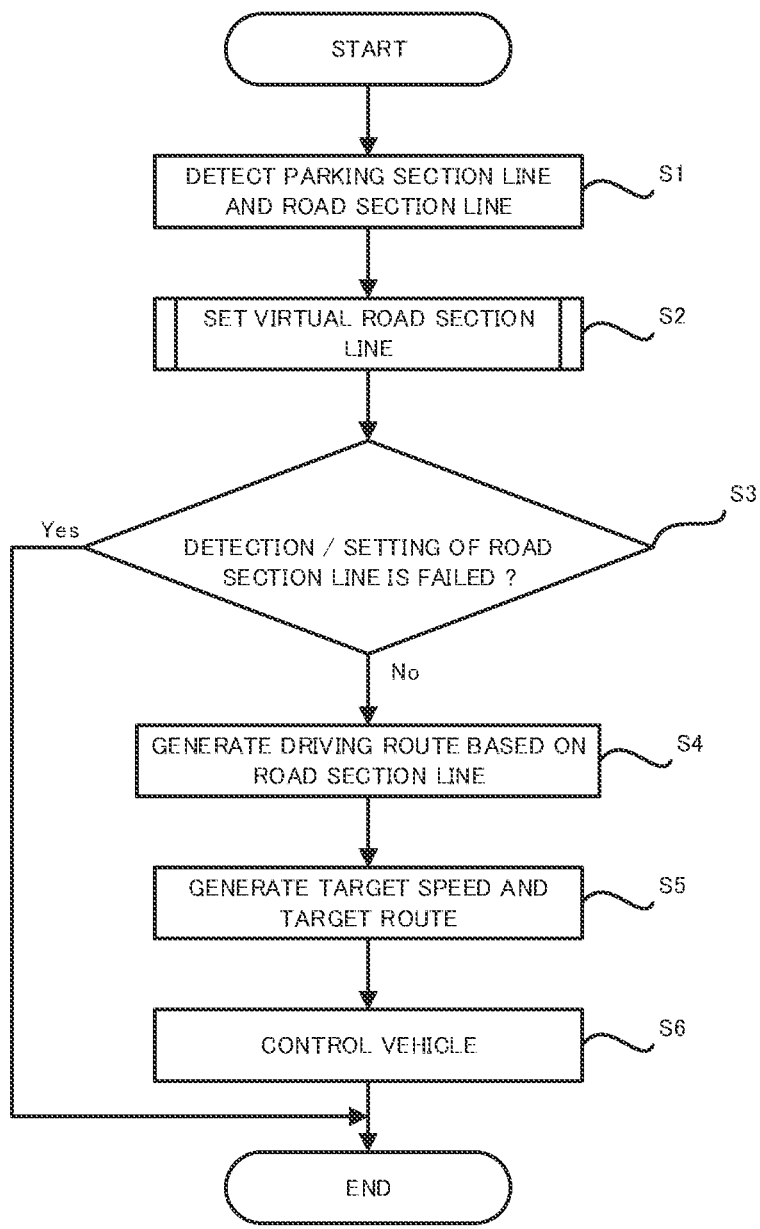
FIG. 2 is a flowchart that illustrates a flow of a driving support operation in the present embodiment.
Figure 5:
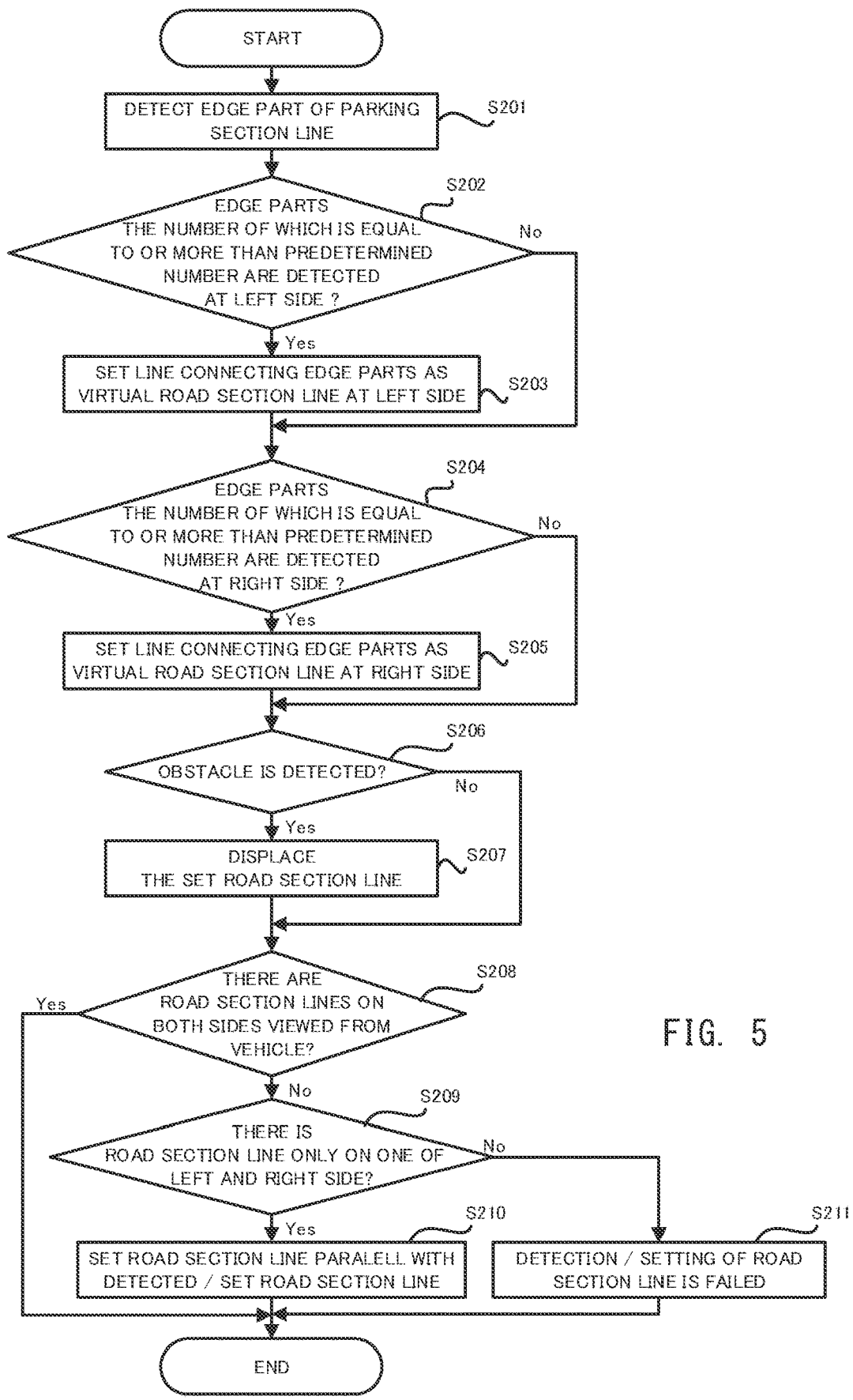

FIG. 5 is a flowchart that illustrates a flow of an operation for setting a virtual road section line at a step S2 in FIG. 2.

Figure 6A:
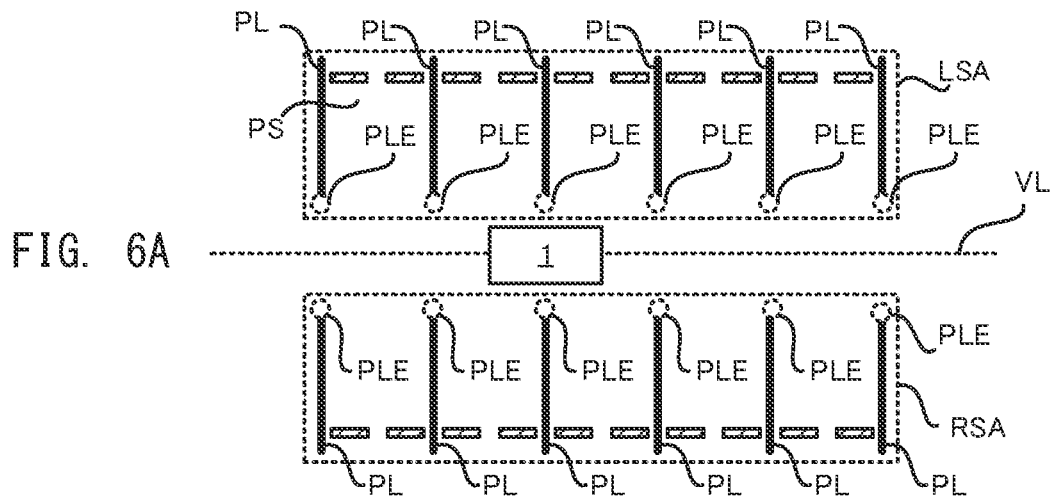
Figure 6B:
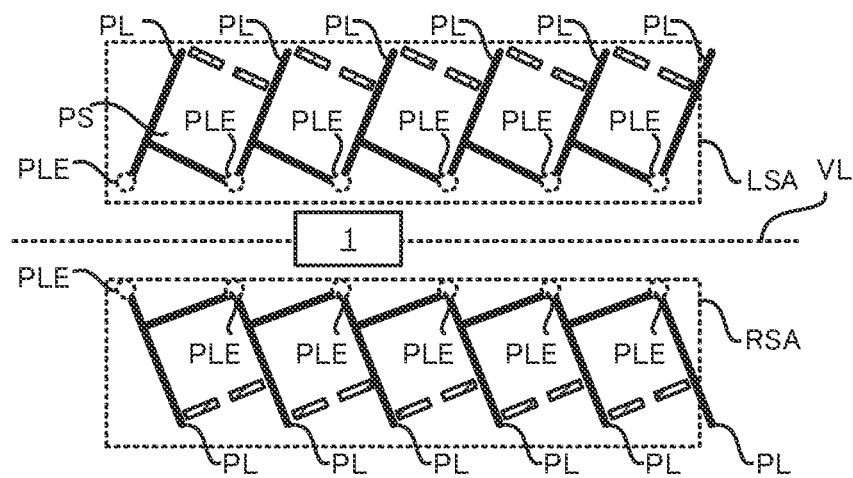
Figure 6C:
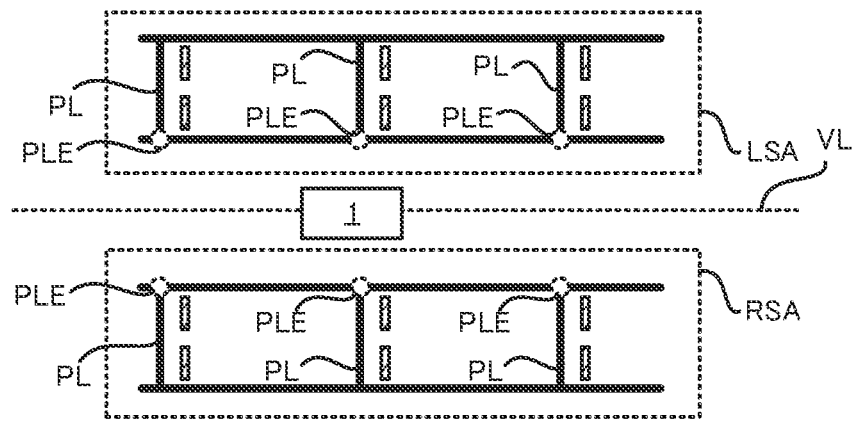

Each of FIG. 6A to FIG. 6C is a planar view that illustrates one example of an edge part of the parking section line.

Figure 7:
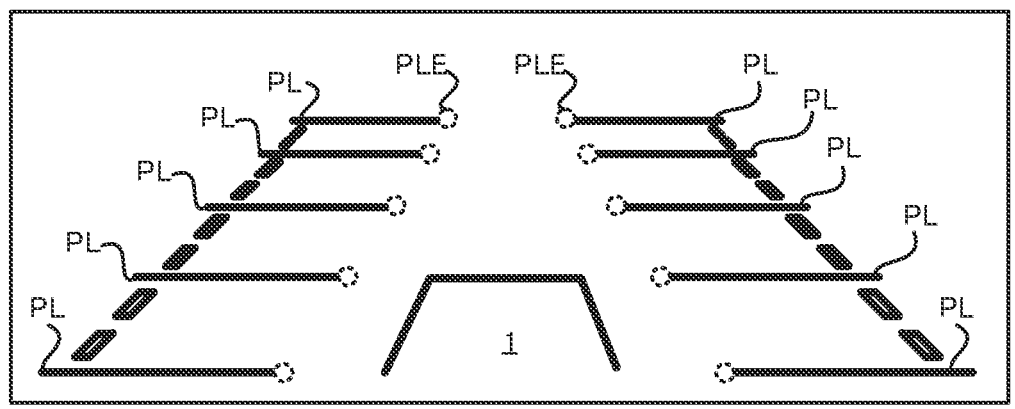

FIG. 7 is a schematic diagram that illustrates an image that is actually captured by an external surrounding detect apparatus.

Figure 8:
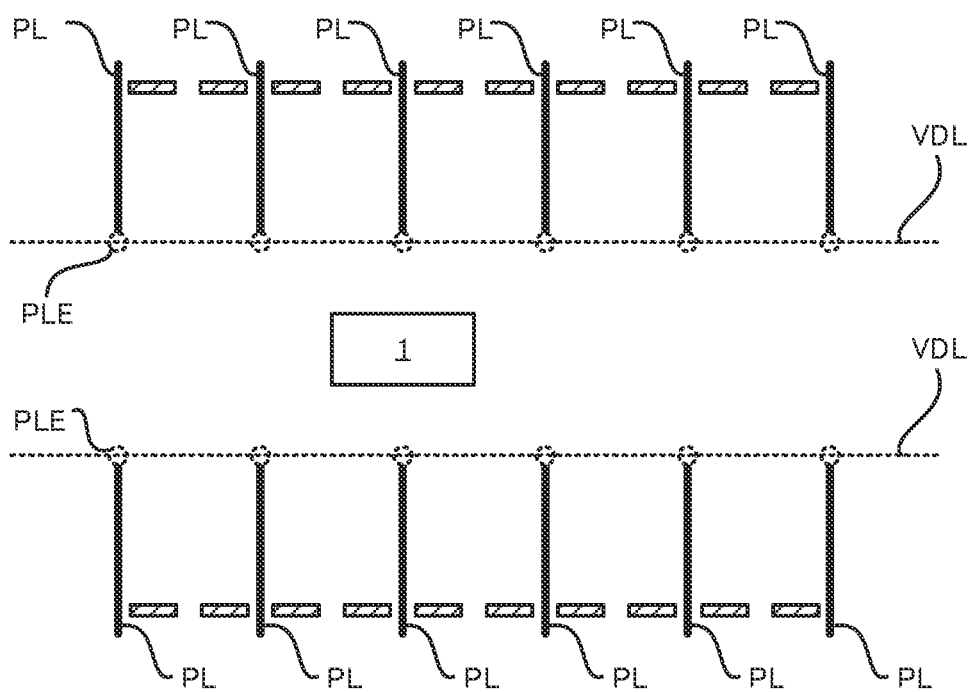

FIG. 8 is a planar view that illustrates the virtual road section line obtained by connecting the edge parts of the parking section lines.

Figure 9:
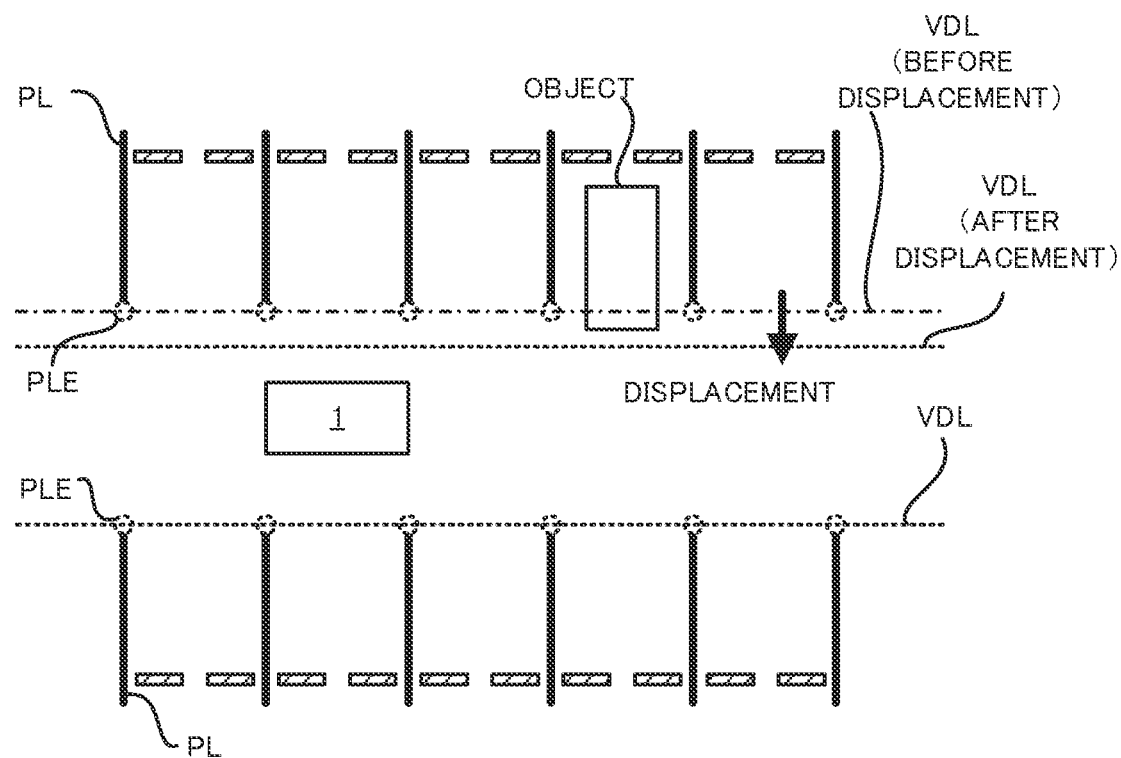

FIG. 9 is a planar view that illustrates an aspect of displacing the virtual road section line on the basis of a detected obstacle.

Figure 10:
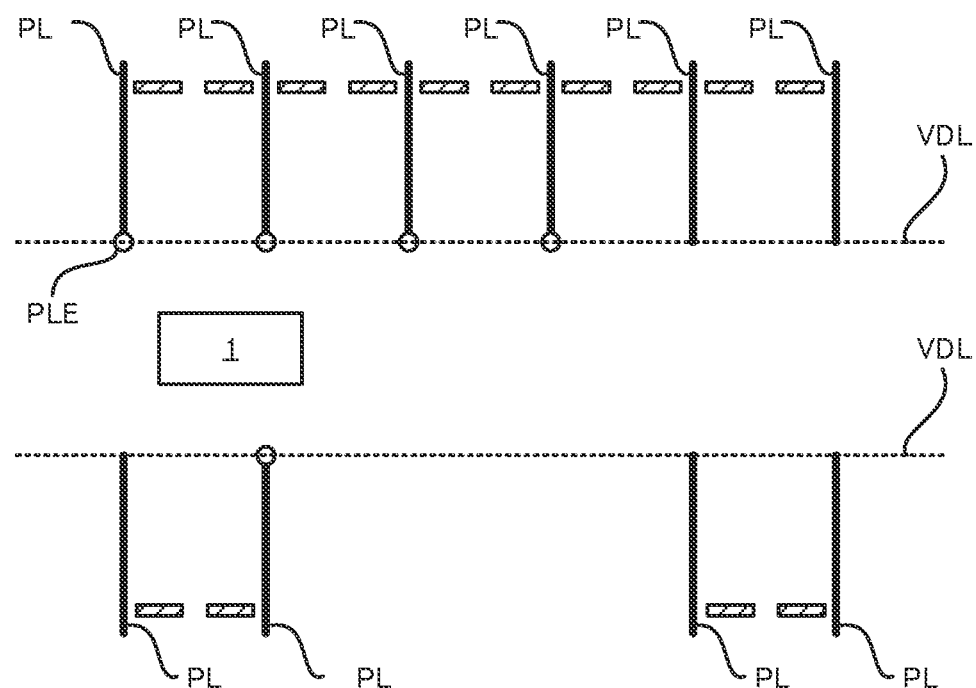

FIG. 10 is a planar view that illustrates an aspect of setting the virtual road section line on the right side viewed from the vehicle on the basis of the virtual road section line set on the left side viewed from the vehicle, when the virtual road section line is set only on the left side viewed from the vehicle.

Figure 11:
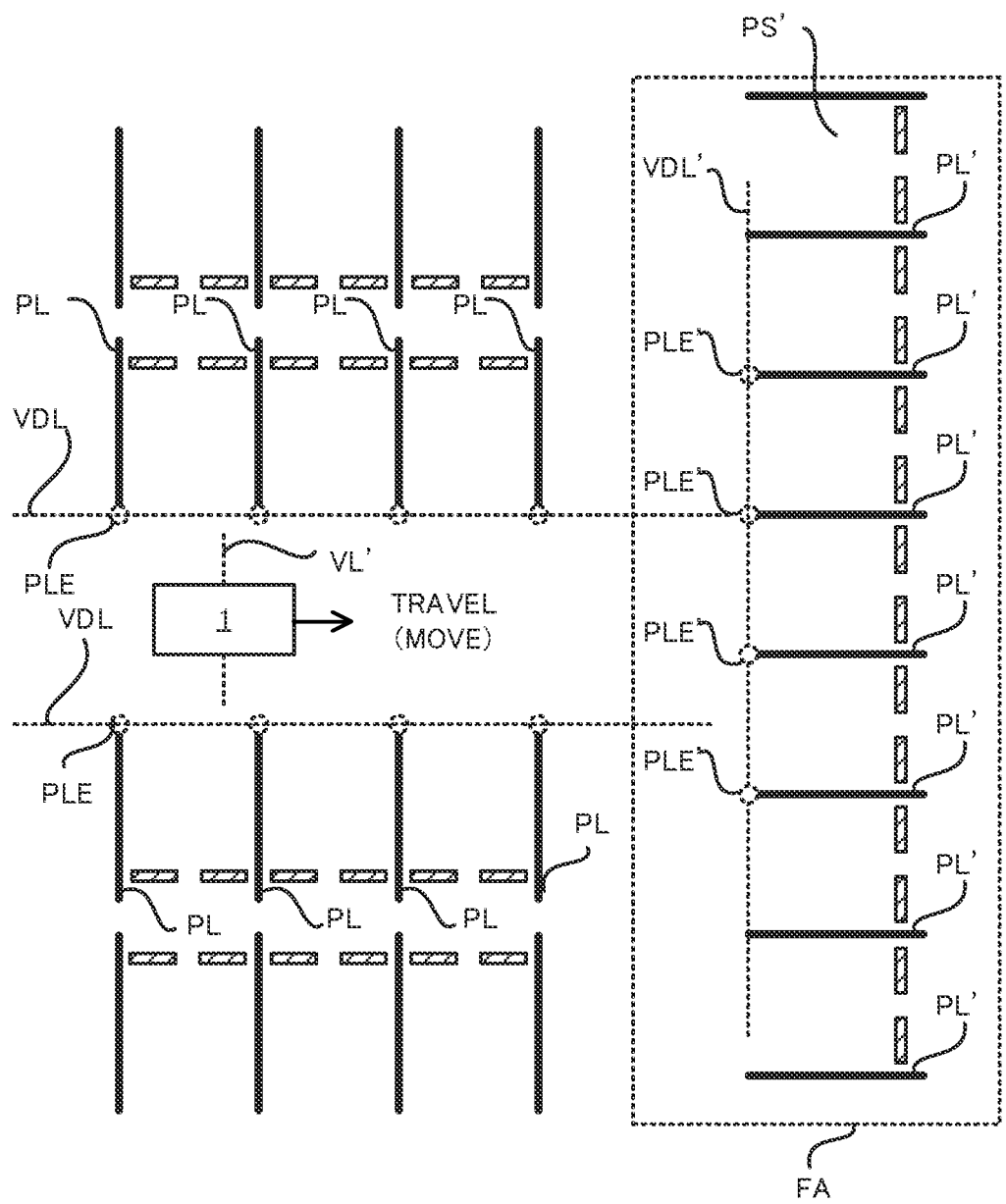

FIG. 11 is a planar view that illustrates the virtual road section line set on the front side viewed from the vehicle.

Figure 12:
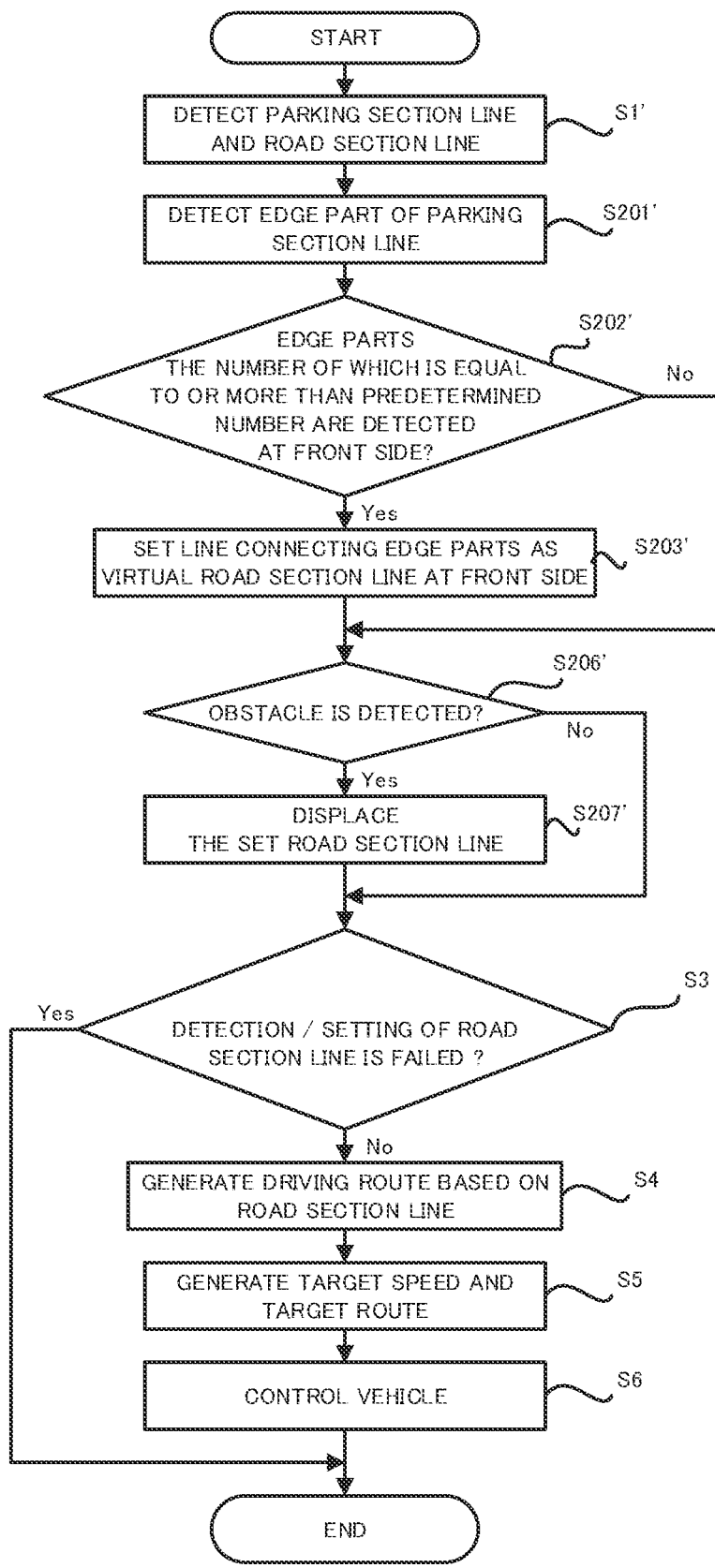

FIG. 12 is a flowchart that illustrates a flow of the driving support operation for setting the virtual road section line on the front side viewed from the vehicle.

DESCRIPTION OF EMBODIMENTS

Hereinafter, with reference to drawings, one embodiment of the driving support apparatus of the present invention will be described. In the following description, a vehicle 1 to which one embodiment of the driving support apparatus of the present invention is adapted will be described.

(1) STRUCTURE OF VEHICLE 1

Figure 1:
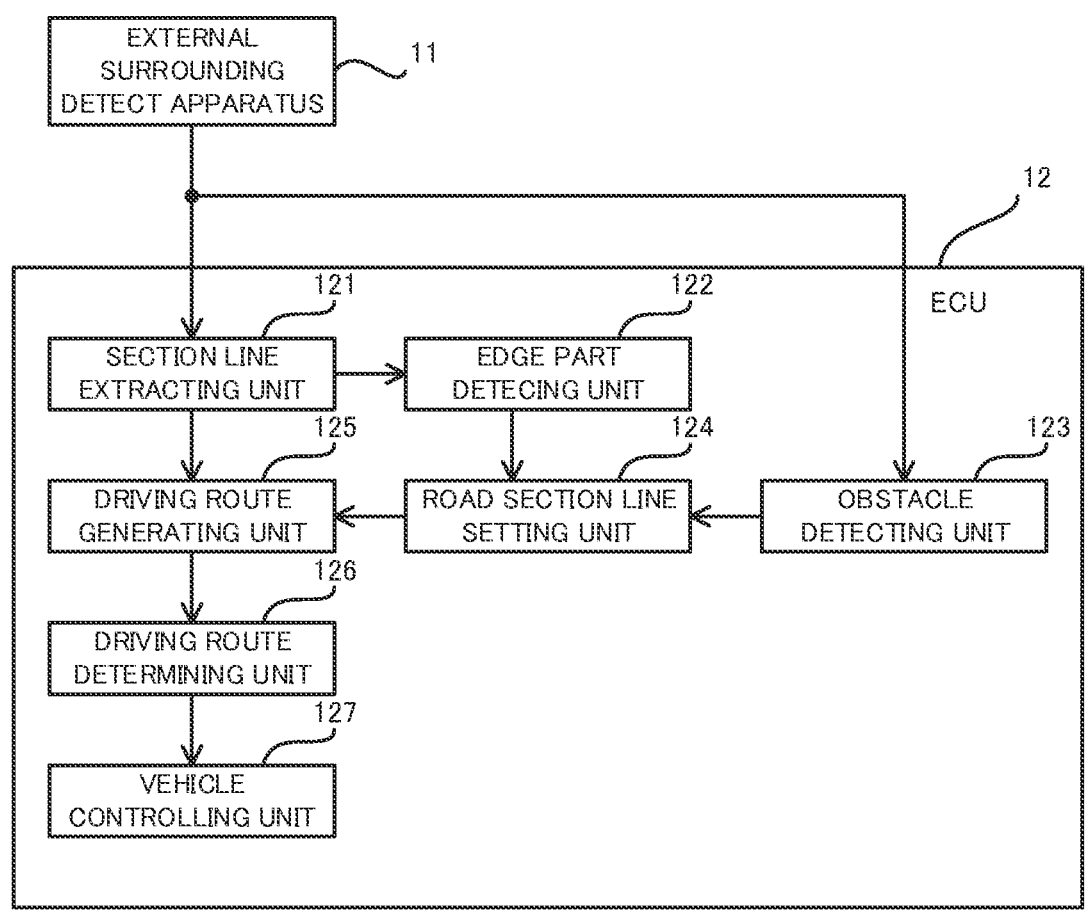
FIG. 1 is a block diagram that illustrates a structure of a vehicle in a present embodiment.

Firstly, with reference to FIG. 1, the structure of the vehicle 1 in the present embodiment will be explained. FIG. 1 is a bock diagram that illustrates a structure of the vehicle 1 in a present embodiment.

As illustrated in FIG. 1, the vehicle 1 has: an external surrounding detect apparatus 11; and an ECU (Electronic Control Unit) 12 that is one example of a "driving support apparatus" and a "controller" in a below described additional statement.

The external surrounding detect apparatus 11 is an imaging device that is configured to image an external circumstance (in other words, an external condition or an external situation) of the vehicle 1. Especially, the external surrounding detect apparatus 11 is configured to image a surrounding circumstance of the vehicle 1. The external surrounding detect apparatus 11 includes a camera that is configured to image an area on the front side viewed from the vehicle 1 (in other words, an area on the front of the vehicle 1), a camera that is configured to image an area on the right side viewed from the vehicle 1 (in other words, an area on the right of the vehicle 1), a camera that is configured to image an area on the left side viewed from the vehicle 1 (in other words, an area on the left of the vehicle 1) and a camera that is configured to image an area on the rear side viewed from the vehicle 1 (in other words, an area on the rear of the vehicle 1), for example.

The ECU 12 is configured to control entire operation of the vehicle 1. Especially in the present embodiment, the ECU 12 is configured to perform a driving support operation for supporting the vehicle 1 to travel at a parking lot. In order to execute the driving support operation, the ECU 12 includes, as processing blocks that are logically realized in the ECU 12 or processing circuits that are physically realized in the ECU 12, a section line extracting unit 121; an edge part detecting unit 122 that is one example of a "detecting device" in the below described additional statement; an obstacle detecting unit 123 that is one example of a "detecting device" in the below described additional statement; a road section line setting unit 124 that is one example of a "setting device" in the below described additional statement; a driving route generating unit 125; a driving route determining unit 126; and a vehicle controlling unit 127 that is one example of a "supporting device" in the below described additional statement. Note that the operation of each of the section line extracting unit 121, the edge part detecting unit 122, the obstacle detecting unit 123, the road section line setting unit 124, the driving route generating unit 125, the driving route determining unit 126 and the vehicle controlling unit 127 will be described later in detail with reference to FIG. 2 and so on, and thus the description thereof is omitted here.

(2) FLOW OF DRIVING SUPPORT OPERATION

Next, with reference to FIG. 2, a flow of the driving support operation in the present embodiment will be described. FIG. 2 is a flowchart that illustrates the flow of the driving support operation in the present embodiment.

Note that the driving support operation illustrated in FIG. 2 is executed (in other words, performed) when the vehicle 1 travels (in other words, moves) at the parking lot. Thus, the ECU 12 may determine whether or not the vehicle 1 travels at the parking lot on the basis of a current position of the vehicle 1 that is obtained by using a GPS and so on and a map information of a navigation system, and may execute the driving support operation illustrated in FIG. 2 if it is determined that the vehicle 1 travels at the parking lot. Alternatively, the ECU 12 may execute the driving support operation illustrated in FIG. 2 in response to an instruction from a driver (or an occupant) of the vehicle for requesting the execution of the driving support operation illustrated in FIG. 2.

As illustrated in FIG. 2, firstly, the section line extracting unit 121 extracts (in other words, detects) a road section line DL and a parking section line PL from an image captured by the external surrounding detect apparatus 11 (namely, from the surrounding image of the vehicle 1) (a step S1).

The road section line DL is a section line (typically, a white line, the same applies to the following description) that is drawn on a road surface to define an area (for example, a road) at which the vehicle 1 is allowed to travel. The road section line DL is a section line that is drawn at a left side area LSA or a right side area RSA and that extends along a traveling direction of the vehicle 1 under the situation where the vehicle 1 travels at a driving space (for example, the road) in the parking lot. The left side area LSA is one example of a "specific area" in the below described additional statement and is an area that extends along (namely, substantially in parallel with) the traveling direction of the vehicle 1 on the left side viewed from the vehicle 1 in the image captured by the external surrounding detect apparatus 11. The right side area RSA is one example of the "specific area" in the below described additional statement and is an area that extends along the traveling direction of the vehicle 1 on the right side viewed from the vehicle 1 in the image captured by the external surrounding detect apparatus 11. Note that there is a possibility that the road section line DL is not drawn at the parking lot. Therefore, the section line extracting unit 121 may not extract the road section line DL sometimes.

The parking section line PL is a section line (typically, a white line, the same applies to the following description) that is drawn on a road surface to define a parking spot (in other words, a parking space or a parking area, and an area at which one vehicle 1 is allowed to be parked) PS at which the vehicle 1 should be parked, as illustrated in FIG. 3A to FIG. 3C each of which illustrates a planar view of one portion of the parking lot. The parking section line PL is usually a section line that is drawn at the left side area LSA or the right side area RSA and that extends along a direction intersecting with (for example, a direction perpendicular to or inclined to) the traveling direction of the vehicle 1. Furthermore, the parking section line PL has characteristics that a plurality of parking section lines PL are arranged along the traveling direction of the vehicle 1 in the left side area LSA or the right side area RSA. FIG. 3A illustrates one example of the parking section line PL that defines the parking spot PS at which the vehicle 1 should be parked to face in a direction that is substantially perpendicular to the traveling direction (a left to right direction in FIG. 3A) of the vehicle 1 in the parking lot. For example, FIG. 3A illustrates one example of the parking section line PL including the section line that is substantially perpendicular to the traveling direction of the vehicle 1 in the parking lot. FIG. 3B illustrates one example of the parking section line PL that defines the parking spot PS at which the vehicle 1 should be parked to face in a direction that is inclined to the traveling direction (a left to right direction in FIG. 3B) of the vehicle 1 in the parking lot. For example, FIG. 3B illustrates one example of the parking section line PL including the section line that is substantially inclined to the traveling direction of the vehicle 1 in the parking lot. FIG. 3C illustrates one example of the parking section line PL that defines the parking spot PS at which the vehicle 1 should be parked to face in the traveling direction (a left to right direction in FIG. 3C) of the vehicle 1 in the parking lot (namely, the vehicle 1 should be parked parallel). For example, FIG. 3C illustrates one example of the parking section line PL including the section line that is along the traveling direction of the vehicle 1 in the parking lot. As can be expected from FIG. 3A to FIG. 3C, the parking section line PL is typically drawn along a border (typically, at least one of a front border, a left border, a right border and a rear border) of the parking spot PS. Incidentally, although FIG. 3C illustrates a section line L0 that substantially defines the parking spot PS and that extends along the traveling direction of the vehicle 1. This section line L0 is extracted as not the parking section line PL but the road section line DL in accordance with the above described criteria.

Note that FIG. 3A to FIG. 3C illustrate an example in which the plurality of parking spots PS are arranged in both of the left side area LSA and the right side area RSA. However, as illustrated in FIG. 4, there may be the parking lot in which the plurality of parking spots PS are arranged in either one of the left side area LSA and the right side area RSA and the parking spot PS is not arranged (for example, the road section line DL is drawn in an example illustrated in FIG. 4) in the other one of the left side area LSA and the right side area RSA. The present embodiment may be adapted to the vehicle 1 that travels at the parking lot illustrated in FIG. 4.

Then, the ECU 12 sets a virtual road section line DL on the basis of the parking section line PL extracted at the step S1 (a step S2). Note that the virtual road section line DL is referred to as a "road section line VDL" hereinafter, in order to distinguish the virtual road section line VDL from the road section line DL extracted at the step S1. Although the road section line VDL is not actually drawn on the road surface of the parking lot, the road section line VDL is a virtual section line that is allowed to be deemed to substantially define the area at which the vehicle 1 is allowed to travel on the basis of the drawn aspect of the extracted parking section line PL. In the following description, with reference to FIG. 5, an operation of setting the road section line VDL will be described.

As illustrated in FIG. 5, firstly, the edge part detecting unit 122 detects an edge part (in other words, an edge point) PLE of the parking section line PL extracted at the step S1 (a step S201). The edge part PLE in the present embodiment is the nearest one of a beginning edge part and an end edge part of a line segment of the parking section line PL that is nearest to the driving space at which the vehicle 1 actually travels in the parking lot. The driving space is a virtual area that extends from the vehicle 1 toward the front side and the rear side viewed from the vehicle 1 along the traveling direction of the vehicle 1. Note that the edge part PLE is one example of a "specific edge part" in the below described additional statement.

For example, FIG. 6A illustrates an example in which the plurality of parking spots PS at each of which the vehicle 1 should be parked to face in the direction that is substantially perpendicular to the traveling direction of the vehicle 1 are defined by the plurality of parking section lines PL each of which extends in a direction intersecting with the traveling direction of the vehicle 1. FIG. 6B illustrates an example in which the plurality of parking spots PS at each of which the vehicle 1 should be parked to face in the direction that intersects with the traveling direction of the vehicle 1 are defined by the plurality of parking section lines PL each of which extends in a direction intersecting with the traveling direction of the vehicle 1. FIG. 6C illustrates an example in which the plurality of parking spots PS at each of which the vehicle 1 should be parked to face in the traveling direction of the vehicle 1 are defined by the plurality of parking section lines PL each of which extends in a direction intersecting with the traveling direction of the vehicle 1. In this case, as illustrated in FIG. 6A to FIG. 6C, the edge part detecting unit 122 detects, as the edge part PLE, one edge part from among the edge parts of each of the plurality of parking section lines PL, wherein the detected one edge parts is nearer to the driving space than the other one of the edge parts that is not detected as the edge part PLE. Specifically, one edge part that is nearer to the driving space than the other one edge part among the edge parts of the parking section line PL drawn in the left side area LSA corresponds to one edge part that is nearer to the right side area RSA than the other one edge part among the edge parts of the parking section line PL. One edge part that is nearer to the driving space than the other one edge part among the edge parts of the parking section line PL drawn in the right side area RSA corresponds to one edge part that is nearer to the left side area LSA than the other one edge part among the edge parts of the parking section line PL.

As can be expected from FIG. 6A to FIG. 6C, one edge part that is nearer to the driving space than the other one edge part among the edge parts of the parking section line PL substantially corresponds to one edge part that is nearer to a virtual line VL that extends from the vehicle 1 along the traveling direction of the vehicle 1 (namely, a virtual line VL located in the driving space) than the other one edge part among the edge parts of the parking section line PL1. Thus, the edge part detecting unit 122 may set the virtual line VL and may detects the edge part PLE that is nearer to the driving space among the edge parts of the parking section line PL1 on the basis of the virtual line VL.

Note that the image captured by the external surrounding apparatus 11 is actually an image having a depth (namely, substantially an image corresponding to a perspective diagram), as illustrated in FIG. 7. However, in the below described description, the planer view (namely, a diagram viewed from an upper side) illustrated in FIG. 3A to FIG. 3C, FIG. 4 and FIG. 6A to FIG. 6C is used for the purpose of simple and clear illustration.

Again in FIG. 5, then, the road section line setting unit 124 determines whether or not the edge parts PLE the number of which is equal to or more than a predetermined number are detected in the left side area LSA that extends on the left side viewed from the vehicle 1 (a step S202). As described below, an approximate line that connects the detected edge parts PLE is set to the road section line VDL in the present embodiment. Thus, the predetermined number used for the determination at the step S202 corresponds to the number of the edge parts PLE from which the approximate line is allowed to be generated. The predetermined number is any number that is equal to or more than two.

As a result of the determination at the step S202, if it is determined that the edge parts PLE the number of which is equal to or more than the predetermined number are detected in the left side area LSA (the step S202: Yes), the road section line setting unit 124 calculates the approximate line (for example, a straight line or a curved line) that connects the edge parts PLE the number of which is equal to or more than the predetermined number detected in the left side area LSA, and sets the calculated approximate line to the road section line VDL at the left side area LSA, as illustrated in FIG. 8 (a step S203). On the other hand, as a result of the determination at the step S202, if it is determined that the edge parts PLE the number of which is equal to equal to or more than the predetermined number are not detected in the left side area LSA (the step S202: No), the road section line setting unit 124 does not calculate the approximate line that connects the edge parts PLE the number of which is less than the predetermined number detected in the left side area LSA. Namely, the road section line setting unit 124 does not set the road section line VDL at the left side area LSA.

Moreover, the road section line setting unit 124 determines whether or not the edge parts PLE the number of which is equal to or more than the predetermined number are detected in the right side area LSA that extends on the right side viewed from the vehicle 1 (a step S204). As a result of the determination at the step S204, if it is determined that the edge parts PLE the number of which is equal to or more than the predetermined number are detected in the right side area RSA (the step S204: Yes), the road section line setting unit 124 calculates the approximate line that connects the edge parts PLE the number of which is equal to or more than the predetermined number detected in the right side area RSA, and sets the calculated approximate line to the road section line VDL at the right side area RSA, as illustrated in FIG. 8 (a step S205). On the other hand, as a result of the determination at the step S204, if it is determined that the edge parts PLE the number of which is equal to equal to or more than the predetermined number are not detected in the right side area RSA (the step S204: No), the road section line setting unit 124 does not calculate the approximate line that connects the edge parts PLE the number of which is less than the predetermined number detected in the right side area RSA. Namely, the road section line setting unit 124 does not set the road section line VDL at the right side area RSA.

Then, the obstacle detecting unit 123 determines whether or not an object that is in the way of the road section line VDL set at at least one of the step S203 and the step S205 is detected in the image captured by the external surrounding detect apparatus 11 (a step S206). Note that the "object that is in the way of the road section line VDL" may be the object that intersects with the road section line VDL. In other words, "object that is in the way of the road section line VDL" may be the object that is located on or above the road section line VDL. At least one of another vehicle parked at the parking spot PS, another vehicle that exits from the parking spot PS and a fallen object is one example of the object.

As a result of the determination at the step S206, if it is determined that the object that is in the way of the road section line VDL is detected (the step S206: Yes), the road section line setting unit 124 displaces the road section line VDL that is in the way of the object so that the object is not in the way of the displaced road section line VDL, as illustrated in FIG. 9 (a step S207). Note that the "displacement of the road section line VDL" means a parallel displacement of the road section line VDL along a direction that intersects with (typically, that is perpendicular to) an extending direction of the road section line VDL. In this case, the road section line setting unit 124 displaces the road section line VDL toward the vehicle 1 (in other words, toward the driving space). Namely, the road section line setting unit 124 displaces the road section line VDL so that the road section line VDL gets closer to the vehicle 1. Specifically, if the object is in the way of the road section line VDL set at the left side area LSA, the road section line setting unit 124 displaces the road section line VDL so that the road section line VDL gets closer to the right side are RSA. If the object is in the way of the road section line VDL set at the right side area RSA, the road section line setting unit 124 displaces the road section line VDL so that the road section line VDL gets closer to the left side are LSA.

On the other hand, as a result of the determination at the step S206, if it is determined that the object that is in the way of the road section line VDL is not detected (the step S206: No), the road section line setting unit 124 may not displace the road section line VDL.

Then, the road section line setting unit 124 determines whether or not the road section line DL is extracted and/or the road section line VDL is set at both of the right side and the left side viewed from the vehicle (namely, at both of the left side area LSA and the right side area RSA) (a step S208). Namely, the section line setting unit 124 determines whether or not the road section line DL is extracted and/or the road section line VDL is set at the left side area LSA and the road section line DL is extracted and/or the road section line VDL is set at the right side area RSA.

As a result of the determination at the step S208, if it is determined that the road section line DL is extracted and/or the road section line VDL is set at both of the left side area LSA and the right side area RSA (the step S208: Yes), the ECU 12 terminates the operation for setting the road section line VDL. On the other hand, as a result of the determination at the step S208, if it is determined that the road section line DL is not extracted and the road section line VDL is not set at the left side area LSA and/or the right side area RSA (the step S208: No), the road section line setting unit 124 determines whether or not the road section line DL is extracted and/or the road section line VDL is set at only one of the left side area LSA and the right side area RSA (a step S209). Namely, the road section line setting unit 124 determines whether or not the road section line DL is extracted and/or the road section line VDL is set at one of the left side area LSA and the right side area RSA and the road section line DL is not extracted and the road section line VDL is not set at the other one of the left side area LSA and the right side area RSA.

As a result of the determination of the step S209, if it is determined that the road section line DL is extracted and/or the road section line VDL is set at one of the left side area LSA and the right side area RSA and the road section line DL is not extracted and the road section line VDL is not set at the other one of the left side area LSA and the right side area RSA (the step S209: Yes), the road section line setting unit 124 sets the road section line VDL at the other one of the left side area LSA and the right side area RSA on the basis of the extracted road section line DL or the set road section line VDL at one of the left side area LSA and the right side area RSA (a step S210). Specifically, two road section lines DL that define same driving lane (namely, two road section lines DL that are located at right side and left side viewed from the vehicle 1, respectively, so that the vehicle 1 is located between two road section lines DL) are usually nearly parallel to each other. In the present embodiment, the road section line setting unit 124 sets the line that is parallel to the road section line DL or VDL at one of the left side area LSA and the right side area RSA to the road section line VDL at the other one of the left side area LSA and the right side area RSA, by using the fact that two road section lines DL each of which is located at respective one of the right side and left side viewed from the vehicle 1 are parallel to each other. Specifically, as illustrated in FIG. 10, the road section line setting unit 124 sets, to the road section line VDL at the other one of the left side area LSA and the right side area RSA, the line that is parallel to the road section line DL or VDL at one of the left side area LSA and the right side area RSA and that passes through at least one edge part detected at the other one of the left side area LSA and the right side area RSA. For example, FIG. 10 illustrates an example in which the line that is parallel to the road section line VDL at the left side area LSA and that passes through one edge part PLE detected at the right side area RSA is set to the road section line VDL at the right side area RSA when the road section line VDL is set at the left side area LSA and the road section line DL is not extracted and the road section line VDL is not set at the right side area RSA.

However, it is required that at least one edge part PLE is detected at the other one of the left side area LSA and the right side area RSA at which it is determined that the road section line DL is not extracted and the road section line VDL is not set, in order to set the road section line VDL at the step S210. If the edge part PLE is not detected, the road section line setting unit 124 may transmit, to the driving route generating unit 125, the information that the extraction (in other words, the detection) of the road section line DL and the setting of the road section line VDL are failed, without executing the process of the step S210 (a step S211).

Note that the obstacle detecting unit 123 may determine whether or not the object that is in the way of the road section line VDL set at the step S210 is detected, after the road section line VDL is set at the step S210. Furthermore, if it is determined that the object that is in the way of the road section line VDL is detected, the road section line setting unit 124 may displace the road section line VDL set at the step S210 so that the object is not in the way of the displaced road section line VDL. Namely, the ECU 12 may execute the process from the step S206 to the step S207 in FIG. 5 with respect to the road section line VDL set at the step S210.

On the other hand, as a result of the determination of the step S209, if it is determined that the road section line DL is not extracted and the road section line VDL is not set at both of the left side area LSA and the right side area RSA (the step S209: No), the road section line setting unit 124 transmits, to the driving route generating unit 125, the information that the extraction (in other words, the detection) of the road section line DL and the setting of the road section line VDL are failed (the step S211).

Again in FIG. 2, then, the driving route generating unit 125 determines whether or not the driving route generating unit 125 has received, from the road section line setting unit 124, the information that the extraction of the road section line DL and the setting of the road section line VDL are failed (a step S3).

As a result of the determination at the step S3, if it is determined that the driving route generating unit 125 has received the information that the extraction of the road section line DL and the setting of the road section line VDL are failed (the step S3: Yes), the ECU 12 terminates the driving support operation illustrated in FIG. 2. Therefore, the vehicle 1 travels at the parking lot in accordance with the driver's operation in this case.

On the other hand, as a result of the determination at the step S3, if it is determined that the driving route generating unit 125 has not received the information that the extraction of the road section line DL and the setting of the road section line VDL are failed (the step S3: No), the driving route generating unit 125 generates a driving route along which the vehicle 1 should travel on the basis of at least one of the extracted road section line DL and the set road section line VDL (hereinafter, at least one of the extracted road section line DL and the set road section line VDL is merely referred to as the "road section line DL" in this paragraph) (a step S4). For example, the driving route generating unit 125 may generate the driving route so that the vehicle 1 travels between two road section lines DL each of which is located at respective one of the right side and the left side viewed from the vehicle 1. In this case, the driving route generating unit 125 may generates the driving route so that a distance between the vehicle 1 and one road section lines DL that is located at the left side viewed from the vehicle 1 is same as a distance between the vehicle 1 and one road section lines DL that is located at the right side viewed from the vehicle 1.

Then, the driving route determining unit 126 generates a target route along which the vehicle 1 should actually travel on the basis of the driving route generated at the step S4 and the surrounding circumstance of the vehicle 1 (a step S5). Specifically, the driving route generating unit 125 generates the driving route without considering the surrounding circumstance of the vehicle 1 at the step S4. Namely, the driving route is an ideal driving route generated on the basis of only the road section line DL at the step S4. On the other hand, there is a possibility that the vehicle 1 collides with an object such as another vehicle and a pedestrian depending on the surrounding circumstance of the vehicle 1 if the vehicle 1 travels along the ideal driving route. Thus, the driving route determining unit 126 generates the target route by correcting the driving route generated at the step S4 on the basis of the surrounding circumstance of the vehicle 1 so that the vehicle 1 does not collides with the object such as another vehicle and a pedestrian. Moreover, the driving route determining unit 126 set a target speed by which the vehicle travels along the target route.

Then, the vehicle controlling unit 127 controls the vehicle 1 so that the vehicle 1 travels along the target route generated at the step S5 by the target speed set at the step S5 (a step S6). For example, the vehicle controlling unit 127 may control a power source (for example, at least one of an engine, a motor and so on) of the vehicle 1, may control a brake apparatus of the vehicle 1, and may control a steering apparatus of the vehicle 1. Moreover, the vehicle controlling unit 127 may control the vehicle 1 so that the vehicle 1 autonomously (in other words, automatically) travels without requiring the driver's operation. Alternatively, the vehicle controlling unit 127 may control the vehicle 1 to assist the traveling of the vehicle 1 that travels in accordance with the driver's operation (for example, to compensate deficiency and excess of a driving power, to compensate deficiency and excess of a braking power, and/or to compensate deficiency and excess of a steering amount).

(3) TECHNICAL EFFECT

As described above, in the present embodiment, the ECU 12 sets the virtual road section line VDK on the basis of the edge part PLE of the parking section line PL. Here, the edge part PLE of the parking section line PL is located on or near a boundary between the parking area PS and an area other than the parking area PS. Thus, it can be said conversely that the edge part PLE of the parking section line PL defines an outer border of the driving space at which the vehicle 1 is allowed to travel. Therefore, it can be said that the virtual road section line VDL that is the approximate line connecting the edge parts PLE of the parking section lines PL substantially define the driving space at which the vehicle 1 is allowed to travel. Thus, the ECU 12 is capable of supporting the vehicle to travel more safely at the parking lot, compared to the case where the road section line VDL is not used. Namely, the ECU 12 is capable of supporting the vehicle to travel more safely at the parking lot by using not only the GPS and the like but also the road section line VDL, compared to the case where the road section line VDL is not used. Alternatively, the ECU 12 the ECU 12 is capable of supporting the vehicle to travel more safely at the parking lot without relying on the GPS and the like a detection result of which may include an error.

Moreover, in the present embodiment, the ECU 12 is capable of setting the road section line VDL on one of the right side and the left side viewed from the vehicle 1 by using the extracted road section line DL and/or the set road section line VDL on the other one of the right side and the left side viewed from the vehicle 1, even if the road section line DL is not extracted and the road section line VDL is not set at one of the left side and the right side viewed from the vehicle 1. Namely, the ECU 12 is capable of setting the road section line VDL by using the fact that there is a high possibility that two road section lines DL each of which is located at respective one of the right side and left side viewed from the vehicle 1 are parallel to each other. Thus, the ECU 12 has more opportunity to support the vehicle 1 on the basis of the road section line VDL.

Moreover, in the present embodiment, the ECU 12 is capable of displacing the road section line VDL so that the displaced road section line VDL is not in the way of the object, if the object is in the way of the set road section line VDL. Therefore, there is no object at the inner side (namely, at the side nearer to the vehicle 1) viewed from the road section line VDL. Thus, the ECU 12 is capable of supporting the vehicle 1 so that the vehicle 1 travels while keeping away from the object that may be an obstacle for the vehicle 1.

(4) MODIFIED EXAMPLE

(4-1) First Modified Example

In the above described description, the virtual rod section line VDL is set at the left side area LSA and/or the right side area RSA. However, the ECU 12 may set the virtual road section line VDL at a front area FA. Note that the front area FA is one example of the "specific area" in the below described additional statement and is an area that extends along a direction that intersects with (typically, is perpendicular to) the traveling direction of the vehicle 1 on the front side viewed from the vehicle 1 in the image captured by the external surrounding detect apparatus 11. For example, as illustrated in FIG. 11, there may be a parking area PS' at the front area FA when the vehicle 1 travels toward a T-shaped intersection in the parking lot. In this case, it can be said that an approximate line that connects edge parts PLE' of the parking section lines PL' that define the parking areas PS' corresponds to an outer border of the driving space at which the vehicle 1 is allowed to travel. Therefore, the approximate line that connects edge parts PLE' of the parking section lines PL' that define the parking areas PS' may be used as a virtual road section line VDL' at the front area FA.

When setting the virtual road section line VDL' at the front area FA, the ECU 12 executed the driving support operation illustrated in FIG. 12, instead of the driving support operation illustrated in FIG. 2 and FIG. 5. In the below described description, with reference to FIG. 12, the driving support operation in the first modified example (namely, the driving support operation for setting the virtual road section line VDL at the front area FA) will be described. FIG. 12 is a flowchart that illustrates a flow of the driving support operation in the first modified example. Note that the process that is different from the process of the driving support operation illustrated in FIG. 2 and FIG. 5 will be described in detail in the below described description. The process that is not particularly described in the first modified example may be same as the process of the driving support operation illustrated in FIG. 2 and FIG. 5.

Specifically, as illustrated in FIG. 12, the section line extracting unit 121 extracts a road section line DL' and a parking section line PL" from an image captured by the external surrounding detect apparatus 11 (a step S1'). The road section line DL' is different from the above described road section line DL in that the road section line DL' is a section line that is drawn at the front area FA and that extends along a direction intersecting with the traveling direction of the vehicle 1. Moreover, the parking section line PL' is different from the above described parking section line PL in that the parking section line PL' is a section line that is drawn at the front area FA and that is not perpendicular to the traveling direction of the vehicle 1 (for example, that extends along the traveling direction of the vehicle 1). Moreover, the parking section line PL' is different from the above described parking section line PL in that the parking section lines PL' are arranged along a direction intersecting with the traveling direction of the vehicle 1 in the parking lot.

Then, the ECU 12 detects the edge part PLE' of the parking section line PL' extracted at the step S1' (a step S201'). The edge part PLE' in the present embodiment is the nearest one of a beginning edge part and an end edge part of a line segment of the parking section line PL' that is nearest to the driving space at which the vehicle 1 actually travels in the parking lot. Namely, the edge part PLE' in the present embodiment is one of the beginning edge part and the end edge part of the line segment of the parking section line PL' that is at the more rear side than the other one of the beginning edge part and the end edge part of the line segment of the parking section line PL'. Note that one edge part that is nearer to the driving space than the other one edge part among the edge parts of the parking section line PL' substantially corresponds to one edge part that is nearer to a virtual line VL' that extends from the vehicle 1 along a direction intersecting with the traveling direction of the vehicle than the other one edge part among the edge parts of the parking section line PL1'.

Then, if it is determined that the edge parts PLE' the number of which is equal to or more than the predetermined number are detected in the front area FA (the step S202': Yes), the road section line setting unit 124 calculates the approximate line (for example, a straight line or a curved line) that connects the edge parts PLE' the number of which is equal to or more than the predetermined number detected in the front area FA, and sets the calculated approximate line to the road section line VDL' at the front area FA, as illustrated in FIG. 8 (a step S203'). On the other hand, if it is determined that the edge parts PLE' the number of which is equal to equal to or more than the predetermined number are not detected in the front area FA (the step S202': No), the road section line setting unit 124 does not set the road section line VDL' at the front area FA.

Then, if it is determined that the object that is in the way of the road section line VDL' set at the step S203' is detected (the step S206': Yes), the road section line setting unit 124 displaces the road section line VDL' that is in the way of the object so that the object is not in the way of the displaced road section line VDL' (a step S207')

Then, also in the first modified example, the ECU 12 executes the process from the step S3 to the step S6. However, in the first modified example, the driving route generating unit 125 may generate the driving route at the step S4 so that the vehicle 1 does not reach the extracted road section line DL' and the set road section line VDL' at the front area FA.

Note that the ECU 12 may set the virtual road section line VDL at a rear area BA in a same manner of setting the virtual road section line VDL at the front area FA. In this case, the operation of setting the virtual road section line VDL at the rear area BA corresponds to an operation obtained by replacing the terms "front area FA" and "rear side" in the description about the operation illustrated in FIG. 12 by the terms "rear area BA" and "front side". Note that the rear area BA is one example of the "specific area" in the below described additional statement and is an area that extends along a direction that intersects with (typically, is perpendicular to) the traveling direction of the vehicle 1 on the rear side viewed from the vehicle 1 in the image captured by the external surrounding detect apparatus 11.

(4-2) Second Modified Example

In the above described description, the road section line setting unit 124 sets the road section line VDL at the right side area RSA by using the road section line DL and/or the road section line VDL at the left side area LSA, if the road section line DL is extracted and/or the road section line VDL is set at the left side area LSA and the road section line DL is not extracted and the road section line VDL is not set at the right side area RSA. However, the road section line setting unit 124 may not set the road section line VDL at the right side area RSA. In this case, the driving route generating unit 125 may generate the driving route on the basis of the road section line DL and/or the road section line VDL at the left side area LSA.

Similarly, in the above described description, the road section line setting unit 124 sets the road section line VDL at the left side area LSA by using the road section line DL and/or the road section line VDL at the right side area RSA, if the road section line DL is extracted and/or the road section line VDL is set at the right side area RSA and the road section line DL is not extracted and the road section line VDL is not set at the left side area LSA. However, the road section line setting unit 124 may not set the road section line VDL at the left side area LSA. In this case, the driving route generating unit 125 may generate the driving route on the basis of the road section line DL and/or the road section line VDL at the right side area RSA.

(5) ADDITIONAL STATEMENT

Relating to the above described embodiment, following additional statements will be disclosed.

(5-1) Additional Statement 1

A driving support apparatus according to the additional statement 1 is a driving support apparatus that is configured to support a vehicle to travel at a parking lot, a parking spot at which the vehicle should be parked is defined by a parking section line at the parking lot, the driving support apparatus has: a detecting device that is configured to detect a specific edge part of the parking section line on the basis of a surrounding image of the vehicle, the specific edge part is an edge part that is nearest to a traveling space among the edge parts of the parking section line, the traveling space is a space at which the vehicle travels at the parking lot; a setting device that is configured to set a virtual road section line if a plurality of specific edge parts are detected by the detecting device at a specific area that is located on a predetermined side viewed from the vehicle, the virtual road section line being an approximate line that connects the plurality of specific edge parts detected by the detecting device at the specific area; and a supporting device that is configured to support the vehicle to travel on the basis of the road section line set by the setting device.

Alternatively, a driving support apparatus according to the additional statement 1 may be a driving support apparatus that is configured to support a vehicle to travel at a parking lot, a parking spot at which the vehicle should be parked is defined by a parking section line at the parking lot, the driving support apparatus has a controller, the controller is programmed to: detect a specific edge part of the parking section line on the basis of a surrounding image of the vehicle, the specific edge part is an edge part that is nearest to a traveling space among the edge parts of the parking section line, the traveling space is a space at which the vehicle travels at the parking lot; set a virtual road section line if a plurality of specific edge parts are detected at a specific area that is located on a predetermined side viewed from the vehicle, the virtual road section line being an approximate line that connects the plurality of detected specific edge parts at the specific area; and support the vehicle to travel on the basis of the set road section line.

The driving support apparatus according to the additional statement 1 sets the virtual road section line on the basis of the specific edge part of the parking section line. Thus, the driving support apparatus is capable of supporting the vehicle to travel more safely at the parking lot, compared to the case where the virtual road section line is not set.

(5-2) Additional Statement 2

A driving support apparatus according to the additional statement 2 is the driving support apparatus according to the additional statement 1, wherein if the detecting device detects the specific edge parts the number of which is equal to or more than a predetermined number (wherein the predetermined number is equal to or more than two) at a first area that is the specific area located on one of the right side and the left side viewed from the vehicle and the detecting device detects the specific edge part the number of which is less than the predetermined number at a second area that is the specific area located on the other one of the right side and the left side viewed from the vehicle, the setting device is configured to (i) set, to the virtual road section line located on one of the right side and the left side viewed from the vehicle, an approximate line that connects the specific edge parts detected at the first area the number of which is equal to or more than the predetermined number and (ii) set, to the virtual road section line located on the other one of the right side and the left side viewed from the vehicle, a line that passes through at least one of the specific edge part detected at the second area the number of which is less than the predetermined number and that is along the set road section line located on one of the right side and the left side viewed from the vehicle.

Alternatively, a driving support apparatus according to the additional statement 2 may be the driving support apparatus according to the additional statement 1, wherein if the specific edge parts the number of which is equal to or more than a predetermined number (wherein the predetermined number is equal to or more than two) are detected at a first area that is the specific area located on one of the right side and the left side viewed from the vehicle and the specific edge part the number of which is less than the predetermined number is detected at a second area that is the specific area located on the other one of the right side and the left side viewed from the vehicle, the controller is programmed to (i) set, to the virtual road section line located on one of the right side and the left side viewed from the vehicle, an approximate line that connects the specific edge parts detected at the first area the number of which is equal to or more than the predetermined number and (ii) set, to the virtual road section line located on the other one of the right side and the left side viewed from the vehicle, a line that passes through at least one of the specific edge part detected at the second area the number of which is less than the predetermined number and that is along the set road section line located on one of the right side and the left side viewed from the vehicle.

The driving support apparatus according to the additional statement 2 is capable of setting the virtual road section line on the other one of the right side and the left side viewed from the vehicle, even if the approximate line connecting the specific edge parts the number of which is equal to or more than the predetermined number cannot be set on the other one of the right side and the left side viewed from the vehicle.

(5-3) Additional Statement 3

A driving support apparatus according to the additional statement 3 is the driving support apparatus according to the additional statement 1 or 2, wherein the detecting device is configured to further detect an object that is in the way of the road section line set by the setting device on the basis of the surrounding image of the vehicle, the setting device is configured to newly set, to the road section line, a line that is obtained by displacing the previously set road section line toward the vehicle along a direction intersecting with an extending direction of the previously set road section line so that the object is not in the way of the previously set road section line after the displacement, if the object is detected.

Alternatively, a driving support apparatus according to the additional statement 3 may be the driving support apparatus according to the additional statement 1 or 2, wherein the controller is programmed to further detect an object that is in the way of the set road section line on the basis of the surrounding image of the vehicle, the controller is programmed to newly set, to the road section line, a line that is obtained by displacing the previously set road section line toward the vehicle along a direction intersecting with an extending direction of the previously set road section line so that the object is not in the way of the previously set road section line after the displacement, if the object is detected.

The driving support apparatus according to the additional statement 3 is capable of supporting the vehicle to travel so that the vehicle travels while keeping away from the object that may be an obstacle for the vehicle.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2017-188766, filed on Sep. 28, 2017, the entire contents of which are incorporated herein by reference. In addition, the entire contents of the above described Patent Literature 1 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A driving support apparatus, which involve such changes, are also intended to be within the technical scope of the present invention.

REFERENCE SIGNS LIST 1 vehicle
11 external surrounding detect apparatus
12 ECU
121 section line extracting unit
122 edge part detecting unit
123 obstacle detecting unit
124 road section line setting unit
125 driving route generating unit
126 driving route determining unit
127 vehicle controlling unit
DL, DL' road section line
VDL, VDL' virtual road section line
PL, PL' parking section line
PS, PS' parking spot
PLE, PLE' edge part
LSA left side area
RSA right side area
FA front area
BA rear area

The invention claimed is:
1. A driving support apparatus that is configured to support a vehicle traveling in a parking lot, a parking spot at which the vehicle should be parked being defined by a parking section line at the parking lot,
the driving support apparatus comprising a controller,
the controller being programmed to:
detect at least one part of the parking section line extending along a traveling direction of the vehicle, on the basis of a surrounding image of the vehicle; and
set a virtual road section line extending along a direction that intersects with the traveling direction when a plurality of the parts are detected at an area that is located on a front side viewed from the vehicle, wherein the virtual road section line is an approximate line that connects the plurality of the parts at the area; and
supports the vehicle so as to travel on the basis of the virtual road section line.
2. The driving support apparatus according to claim 1, wherein the controller is programmed to set the virtual road section line when the parts the number of which is equal to or more than a predetermined number are detected.
3. The driving support apparatus according to claim 2, wherein the controller is programmed to further detect an object that is in the way of the set virtual road section line on the basis of a surrounding image of the vehicle, the controller is programmed to newly set, to the virtual road section line, a line that is obtained by displacing the previously set virtual road section line toward the vehicle along a direction intersecting with an extending direction of the previously set virtual road section line so that the object is not in the way of the previously set virtual road section line after the displacement, if the object is detected.

4. The driving support apparatus according to claim 2, wherein the controller is programmed to further detect an object that is in the way of the set virtual road section line on the basis of a surrounding image of the vehicle, the controller is programmed to newly set, to the virtual road section line, a line that is obtained by displacing the previously set virtual road section line toward the vehicle along a direction intersecting with an extending direction of the previously set virtual road section line so that the object is not in the way of the previously set virtual road section line after the displacement, if the object is detected.

* * * * *